US012665779B2

(12) United States Patent
Shibata

(10) Patent No.: US 12,665,779 B2
(45) Date of Patent: Jun. 23, 2026

(54) ONLINE CONFERENCE APPARATUS AND ONLINE CONFERENCE METHOD

(71) Applicant: FUJIFILM Business Innovation Corp., Tokyo (JP)

(72) Inventor: Yayoi Shibata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/579,567

(22) Filed: Jan. 19, 2022

(65) Prior Publication Data

US 2023/0089451 A1 Mar. 23, 2023

(30) Foreign Application Priority Data

Sep. 22, 2021 (JP) ................................. 2021-153775

(51) Int. Cl.
  *H04L 12/18* (2006.01)
  *G06F 16/176* (2019.01)
  *H04L 67/06* (2022.01)
(52) U.S. Cl.
  CPC ...... *H04L 12/1827* (2013.01); *G06F 16/1774* (2019.01); *H04L 67/06* (2013.01)
(58) Field of Classification Search
  CPC ..... H04L 12/1827; H04L 67/06; H04L 51/10; H04L 51/212; G06F 16/1774; G06F 21/6209; G06F 16/176
  See application file for complete search history.

(56) References Cited

U.S. PATENT DOCUMENTS

| | | | | |
|---|---|---|---|---|
| 9,098,584 | B1* | 8/2015 | Fredinburg | ........... G06F 16/951 |
| 10,146,925 | B1* | 12/2018 | Rosenberg | .............. G06F 21/32 |
| 10,284,558 | B2* | 5/2019 | Owen | ................. H04L 63/0428 |
| 11,645,403 | B2* | 5/2023 | Afroz | ................. G06F 21/6218 |
| | | | | 726/1 |
| 2007/0021137 | A1* | 1/2007 | Kokkonen | .......... H04L 67/1048 |
| | | | | 455/518 |
| 2012/0011197 | A1* | 1/2012 | Arisawa | ................... G06F 21/60 |
| | | | | 709/203 |
| 2013/0179506 | A1* | 7/2013 | Hungerford | ............ H04W 4/20 |
| | | | | 709/204 |
| 2013/0194374 | A1* | 8/2013 | Kieft | ........................ H04N 7/15 |
| | | | | 348/E7.083 |

(Continued)

FOREIGN PATENT DOCUMENTS

| | | | | |
|---|---|---|---|---|
| CN | 117296328 A | * 12/2023 | ........... H04L 65/403 |
| JP | 2016110485 | 6/2016 | |

(Continued)

OTHER PUBLICATIONS

"Office Action of Japan Counterpart Application", issued on May 27, 2025, with English translation thereof, p. 1-p. 6.

(Continued)

*Primary Examiner* — Benjamin M Thieu
(74) *Attorney, Agent, or Firm* — JCIPRNET

(57) ABSTRACT

An online conference apparatus includes: a memory that stores management information for managing availability of sharing for an image; and a processor configured to: process a designation image designated as a sharing target by a participant of an online conference; and apply a sharing restriction to the designation image based on the management information.

15 Claims, 11 Drawing Sheets

(56)                    References Cited

U.S. PATENT DOCUMENTS

| | | | |
|---|---|---|---|
| 2014/0109231 A1* | 4/2014 | Takaoka ................... | G06F 21/60 726/26 |
| 2014/0280955 A1* | 9/2014 | Stuntebeck ............. | H04L 63/20 709/226 |
| 2015/0237143 A1* | 8/2015 | Sinn ........................ | H04N 21/60 709/227 |
| 2018/0091842 A1 | 3/2018 | Kuroda | |
| 2018/0109570 A1* | 4/2018 | Kowal ................... | H04L 65/403 |
| 2019/0073490 A1* | 3/2019 | Agrawal ................ | G06F 3/1454 |
| 2020/0099885 A1* | 3/2020 | Matsumoto .............. | H04N 5/76 |
| 2021/0026509 A1* | 1/2021 | Homma .............. | H04L 65/4015 |
| 2022/0094677 A1* | 3/2022 | Roy ........................ | H04L 63/08 |
| 2022/0103603 A1* | 3/2022 | Vendrow ................. | G06F 40/30 |
| 2022/0309183 A1* | 9/2022 | Jose .................... | G06F 21/6245 |
| 2023/0039068 A1* | 2/2023 | Majdabadi .......... | G06F 21/6272 |
| 2023/0059019 A1* | 2/2023 | Asthana .............. | H04L 65/4015 |

FOREIGN PATENT DOCUMENTS

| | | |
|---|---|---|
| JP | 2016110486 | 6/2016 |
| JP | 6163475 | 7/2017 |
| JP | 6240594 | 11/2017 |
| JP | 2017199314 | 11/2017 |
| JP | 2017220131 | 12/2017 |
| JP | 2018055181 | 4/2018 |
| JP | 6802477 | 12/2020 |

OTHER PUBLICATIONS

"Notice of Reasons for Refusal of Japan Counterpart Application", issued on Sep. 9, 2025, with English translation thereof, p. 1-p. 3.

* cited by examiner

FIG. 2

| IMAGE ATTRIBUTE (48) | SHARING AVAILABILITY (50) | ELEMENT 1 (52-1) | ELEMENT 2 (52-2) | ELEMENT 3 (52-3) | ELEMENT 4 (52-4) | ... |
|---|---|---|---|---|---|---|
| | | SHARING AVAILABILITY (54) | SHARING AVAILABILITY | SHARING AVAILABILITY | SHARING AVAILABILITY | |
| DT | Y | AP WINDOW / AP DEPENDENT | ICON GROUP / N | POP-UP WINDOW / N | TOOLBAR / Y | ... |
| AP1 | N | — / — | — / — | — / — | — / — | ... |
| AP2 | Y | FIELD 1 / Y | FIELD 2 / Y | FIELD 3 / N | FIELD 4 / Y | ... |
| ... | ... | ... / ... | ... / ... | ... / ... | ... / ... | ... |

| AP NAME | FILE SHARING AVAILABILITY |
|---------|---------------------------|
| ********** | ☑ |
| ********** | ☑ |
| ********** | ☐ |
| ... | ... |

FIG. 5

| CONTENTS IN DT | CONTENT SHARING AVAILABILITY |
|---|---|
| * * * * * | ✓ |
| * * * * * | ☐ |
| ⋮ | ⋮ |

Figure 12:
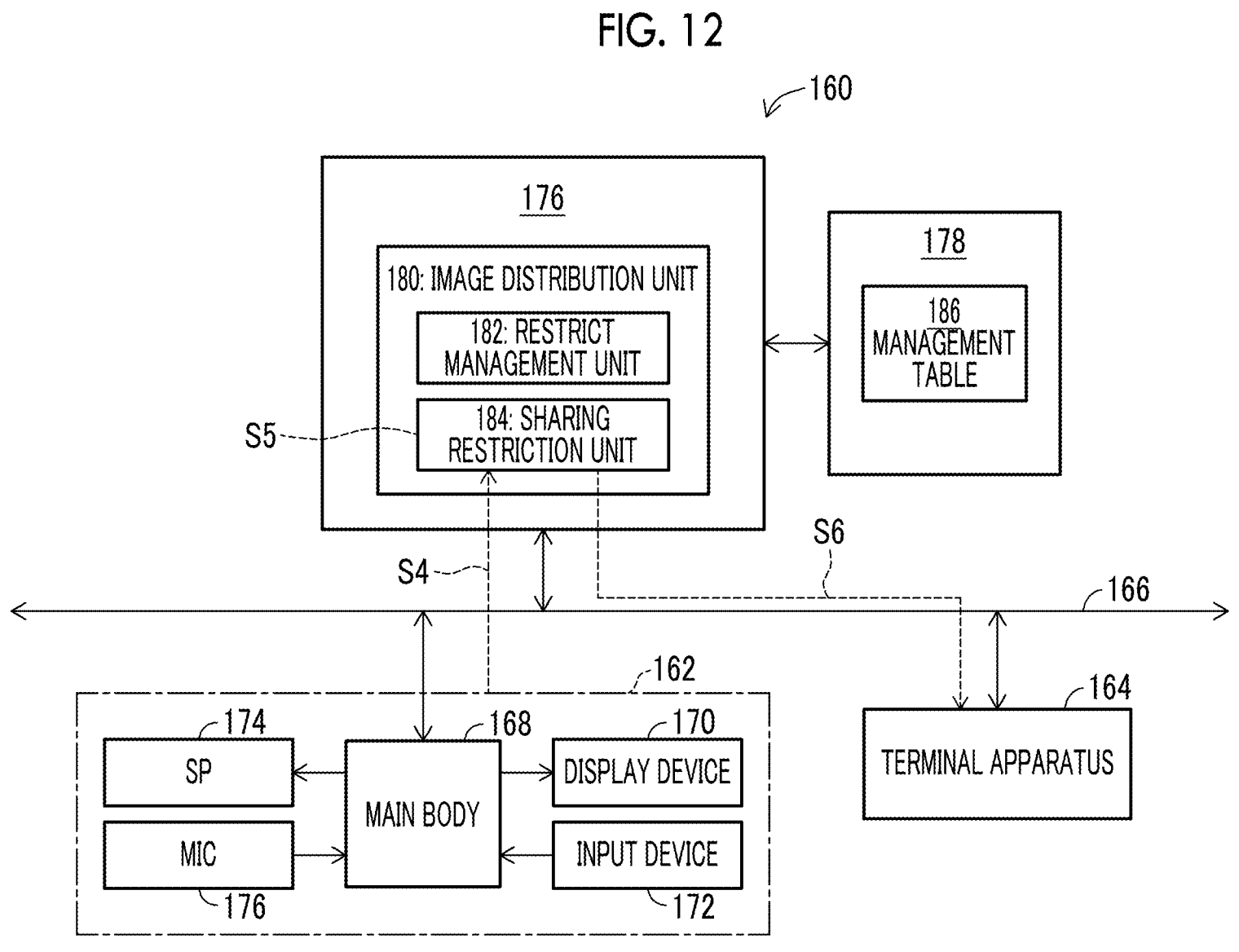

186
MANAGEMENT
TABLE

176

180: IMAGE DISTRIBUTION UNIT

182: RESTRICT
MANAGEMENT UNIT

184: SHARING
RESTRICTION UNIT

S5

S6

166

164
TERMINAL APPARATUS

162

170
DISPLAY DEVICE

172
INPUT DEVICE

168
MAIN BODY

S4

174
SP

176
MIC

ONLINE CONFERENCE APPARATUS AND ONLINE CONFERENCE METHOD

CROSS-REFERENCE TO RELATED APPLICATIONS

This application is based on and claims priority under 35 USC 119 from Japanese Patent Application No. 2021-153775 filed Sep. 22, 2021.

BACKGROUND

(i) Technical Field

The present invention relates to an online conference apparatus and an online conference method.

(ii) Related Art

An online conference system is used for online conferences. The online conference system is usually configured with an online conference server and a plurality of terminal apparatuses. The plurality of terminal apparatuses are used by a plurality of participants who participate in the online conference. The online conferences are also referred to as WEB conferences, remote conferences, and the like.

An image is shared for the online conference, as needed. That is, the image selected as a sharing target by a specific participant is distributed in parallel to all the participants in the online conference. Examples of the shared image include text data, drawing data, and table data. A desktop image may also be the sharing target.

JP2017-220131A, JP2016-110486A, JP2016-110485A, and JP2018-55181A disclose technologies related to image sharing. JP2017-220131A, JP2016-110486A, JP2016-110485A, and JP2018-55181A do not disclose managing the image sharing based on pre-registered information.

SUMMARY

In an online conference, an image designated as a sharing target is distributed to a plurality of participants, that is, the image is shared. An image or a part of the image that is not to be shared may be shared due to an erroneous operation or lack of attention of the participant of the online conference. A problem in the same manner may occur due to other factors.

Aspects of non-limiting embodiments of the present disclosure relate to an online conference apparatus and an online conference method that restrict sharing of an image designated as a sharing target in an online conference in a case where the image is not appropriate for sharing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an online conference apparatus including: a memory that stores management information for managing availability of sharing for an image; and a processor configured to: process a designation image designated as a sharing target by a participant of an online conference; and apply a sharing restriction to the designation image based on the management information.

BRIEF DESCRIPTION OF THE DRAWINGS

Exemplary embodiment(s) of the present invention will be described in detail based on the following figures, wherein:

FIG. 2 is a diagram illustrating an example of a management table;

FIG. 3 is a diagram illustrating an example of a first management image;

FIG. 5 is a diagram illustrating an example of a third management image;

FIG. 6 is a diagram illustrating an example of a mask for the entire image;

FIG. 7 is a diagram illustrating an example of a mask for a part of the image;

FIG. 12 is a diagram illustrating an example of an online conference system according to another exemplary embodiment.

DETAILED DESCRIPTION

Figure 1:
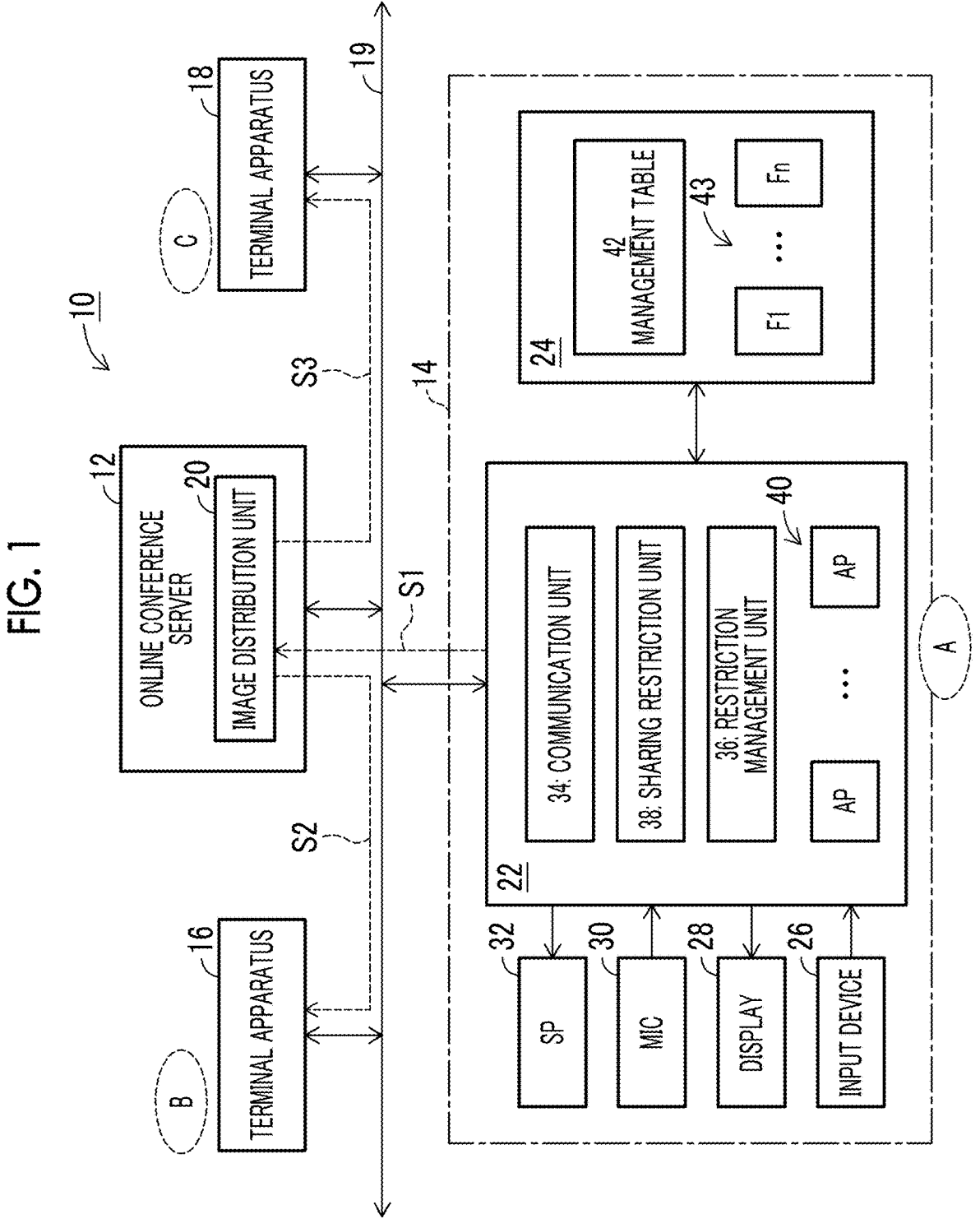
FIG. 1 is a diagram illustrating an example of an online conference system according to an exemplary embodiment.

Hereinafter, exemplary embodiments of the present invention will be described with reference to the drawings.

(1) Outline of Exemplary Embodiment

An online conference apparatus according to an exemplary embodiment includes a memory and a processor. The memory stores management information for managing whether or not sharing of images is restricted. The processor processes a designation image designated as a sharing target by participants of an online conference. The processor applies sharing restrictions to the designation image based on management information.

According to the exemplary embodiment, even in a case where an image that is not a sharing target is designated as a designation image due to an erroneous operation, carelessness, or the like, the sharing restriction is applied to the designation image after the fact. The image that is not appropriate for sharing is no longer distributed to other participants, in other words, the image that is not appropriate for sharing is no longer seen by other participants.

The online conference includes various remote meetings performed via the network. The management information is information registered in advance in order to determine whether or not various images or various image portions can be obtained as a sharing target. The management information may be shared in a plurality of online conferences, or the management information may be shared among a plurality of participants. The designation image is an image designated as a sharing target by the participant, and may include an image including a text, a drawing, a table, and the like. The sharing of the image means referring to or a state of referring to the same image among the plurality of participants who participate in the online conference. A concept of the sharing restriction includes control to prevent the designation image from being distributed and processing to prevent contents of the designation image from being read.

In the exemplary embodiment, the designation image is any of an image generated by application software or a desktop image. The application software is software for a specific application. Data generated by the application software is an image or a conference material, from the viewpoint of browsing by the plurality of participants who participate in the online conference. The desktop image is an image representing a virtual desktop including icons and the like, and generally corresponds to a top-level window generated by an operating system (OS).

In the exemplary embodiment, the sharing restriction includes a sharing restriction for an entirety of the designation image. Specifically, the restriction on sharing the entirety of the designation image includes at least one of prohibition of sharing the designation image itself or a mask for the entirety of the designation image. In the exemplary embodiment, the sharing restriction includes a sharing restriction for a part of the designation image. Specifically, the sharing restriction for the part of the designation image includes a mask for the part of the designation image.

In the exemplary embodiment, the management information is information in a management table in which availability of sharing is registered for each image attribute. The processor determines whether or not to apply the sharing restriction to the designation image, based on the management table. A concept of the image attribute may include application software (for example, a type or a name of the application software) and a desktop.

Specifically, in the exemplary embodiment, the image attribute includes the application software that generates the image. The processor determines whether or not to apply the sharing restriction to the designation image according to the application software that generates the designation image. For example, in a case where a certain file is designated as a sharing target, application software that generates the file is first specified, and then necessity of sharing restrictions for the file is determined based on the specified application software.

In the exemplary embodiment, availability of sharing is registered for each image element, in the management table. The processor also determines whether or not to apply the sharing restriction for each image element in the designation image. The image element is a part of the designation image, and corresponds to a sharing restriction unit.

In the exemplary embodiment, the management information includes information for managing the availability of sharing for each image element in the desktop image. In a case where the designation image is a desktop image, the processor determines whether or not to apply the sharing restriction for each image element in the desktop image. Specifically, the image element is a window. The processor determines whether or not to apply sharing restrictions for each window in the desktop image. The corresponding application software may be specified for each window, and the necessity of sharing restriction may be determined according to the specified application software. The window is a display region in which contents of the file created by application software are displayed.

In the exemplary embodiment, the processor provides information indicating availability of sharing of the window for each window in the desktop image. The above-described information is referred to in a case where the participant searches for a sharing target in the desktop images.

In the exemplary embodiment, the online conference apparatus is a terminal apparatus used by the participant, or is an online conference server connected to the terminal apparatus used by the participant. By incorporating a sharing restriction function into each terminal apparatus, a load on the online conference server is reduced. By incorporating the sharing restriction function into the online conference server, it is possible to collectively restrict sharing for a plurality of terminal apparatuses.

A program according to the exemplary embodiment is executed in an information processing apparatus, and causes the information processing apparatus to work as the online conference apparatus. The program has a function of storing the management information for managing availability of sharing an image in a memory, and a function of applying sharing restrictions to the designation image based on the management information in a case of processing the designation image designated as the sharing target by the participant of the online conference.

The above-described program is installed in the information processing apparatus via a network or a portable storage medium. The program is stored in a non-transitory storage medium in the information processing apparatus. A concept of the information processing apparatus includes various devices such as a computer, an online conference apparatus, a terminal apparatus, an online conference server, and the like.

(2) Detail of Exemplary Embodiment

FIG. 1 illustrates an online conference system 10 according to the exemplary embodiment. The online conference system 10 is configured with an online conference server 12 connected to a network 19 and a plurality of terminal apparatuses 14, 16, and 18. The network 19 is, for example, the Internet or a local area network (LAN).

In a configuration example illustrated in FIG. 1, it is assumed that three participants A, B, and C participate in an online conference, as a premise. The terminal apparatus 14 is used by the participant A, the terminal apparatus 16 is used by the participant B, and the terminal apparatus 18 is used by the participant C. Each of the participants A, B, and C is a user of the online conference system. Each of the online conference server 12 and the terminal apparatuses 14, 16, and 18 can be said to be an online conference apparatus.

The online conference server 12 is configured with an information processing apparatus including a processor. The processor is configured with a CPU that executes a program. The processor performs a plurality of functions. The plurality of functions include an image distribution function and an audio distribution function. The former function is represented as an image distribution unit 20 in FIG. 1. The image distribution unit 20 has a function of distributing an image as a sharing target to a plurality of terminal apparatuses 14, 16, and 18. The participants A, B, and C designate the sharing target in each of the terminal apparatuses 14, 16, and 18.

Hereinafter, in some cases, the image designated as a sharing target is referred to as a designation image. The designation image is an image generated by application software or an image representing a desktop. Specifically, the former image corresponds to text data (which can also be called a text file), drawing data (which can also be called a graphic file), table data (which can also be called a table file), and the like.

The terminal apparatus 14, the terminal apparatus 16, and the terminal apparatus 18 have the same configuration as each other. Here, a configuration of the terminal apparatus 14 will be described. The configuration for a sharing restriction, which will be described below, may be implemented only in a specific terminal apparatus.

The terminal apparatus 14 is configured with an information processing apparatus, and specifically includes a main body 22, a storage unit (memory) 24, an input device 26, a display device 28, a microphone 30, and a speaker 32. The main body 22 has a processor that executes a program. The processor is specifically a CPU. The processor performs a plurality of functions. In FIG. 1, those functions are represented by a plurality of blocks. That is, the main body 22 has a communication unit 34, a restriction management unit 36, a sharing restriction unit 38, and the like. Further, the main body 22 has an application software group 40. A substance of each application software is a program, in the same manner as substances of the communication unit 34, the restriction management unit 36, and the sharing restriction unit 38.

The storage unit 24 is configured with a semiconductor memory, a hard disk, and the like. A management table 42 is stored in the storage unit 24, and a file group 43 is also stored. A file (designation image) as a sharing target is designated from the file group 43.

The input device 26 includes a keyboard, a pointing device, and the like. The display device 28 is configured with, for example, a liquid crystal display. In the online conference, the microphone 30 and the speaker 32 are used by the participant A.

The communication unit 34 exchanges data with an external apparatus. The restriction management unit 36 generates a management image for accepting an image or an image element as a target of a sharing restriction, provides the management image to the user, and registers information input on the management image on the management table 42. In the management table 42, management information that is required for managing availability of sharing, that is, necessity of the sharing restriction is registered.

By referring to contents of the management table 42, that is, the management information, the sharing restriction unit 38 determines whether or not to apply the sharing restriction to each designation image designated as a sharing target. Examples of a method of the sharing restriction include control to prevent the designation image from being distributed to other participants, and processing to prevent other participants from reading contents of the designation image.

In the configuration example illustrated in FIG. 1, the sharing restriction is executed in the individual terminal apparatuses 14, 16, and 18, and as will be described later, the sharing restriction may be executed in the online conference server 12. Hereinafter, a specific method of the sharing restriction will be described below.

FIG. 2 illustrates a specific example of the management table 42. A plurality of pieces of information 44, 46-1, and 46-2 are registered in the management table 42. The information 44 is information for managing sharing of desktop images. The information 46-1 and 46-2 are information for managing sharing of images generated by application software.

As an image attribute 48, a symbol (DT) meaning a desktop or an ID specifying an application (AP) software is registered. Sharing availability 50 indicates whether or not each image can be shared. In a case where sharing is permitted, "Y" is registered as a flag, and in a case where the sharing is prohibited, "N" is registered as the flag.

As indicated by reference numerals 52-1 to 52-4, an element name and availability of sharing are managed for each image element. In a case of images generated by application software, availability of sharing is managed for each field as illustrated in FIG. 2. Here, the field is a part of the image, and corresponds to an area or a content. For example, for AP2, a flag "Y" (see a reference numeral 64) indicating sharing permission is set for a field 1 (see a reference numeral 62).

Examples of an image element of the desktop (see a reference numeral 54) include an application (AP) window, and availability of sharing of the AP window 54 is determined by the corresponding AP (see a reference numeral 56). For example, for AP1, sharing of the entire image is prohibited, and in a case where a window corresponding to AP1 is included in the desktop image, a sharing restriction is applied to the window corresponding to AP1. Specifically, a mask is applied to an image in the window.

For AP2, sharing of the entire image is permitted, but sharing of some fields (for example, field 3) included in the image is prohibited. In a case where the desktop image includes a window corresponding to AP2, the sharing restriction is applied to a part of the window. Meanwhile, the sharing restriction may be applied to the entire window including the part of which the sharing is prohibited.

The sharing is restricted for an icon group (see a reference numeral 58) included in the desktop image (see a reference numeral 60). In addition, the availability of sharing is managed for an element such as a pop-up menu or a toolbar included in the desktop image. A table for managing the availability of sharing for each image and a table for managing the availability of sharing for each image element may be prepared.

In the management table 42, a sharing restriction method may be managed for each sharing target may be managed, or a sharing restriction period for each sharing target may be managed. The availability of sharing may be managed for each file, not for each AP software. Meanwhile, in order to avoid the complexity of designation and to secure a definite sharing restriction, for example, the availability of sharing may be managed by using the AP software as a basic unit.

FIG. 3 illustrates a first management image 68 displayed on a screen 66 of a display device included in a terminal apparatus. The first management image 68 is an image for pre-registering availability of sharing for each AP software. A name of the AP software is listed and displayed in a line 72 specified by the AP name. Information on whether or not to permit or prohibit sharing of files generated by the individual AP software is included in a line 74 having a label of file sharing availability. Specifically, the line 74 includes a plurality of check boxes 76. A user clicks a check box 76 corresponding to the AP software that permits sharing by operating a cursor 78.

Figure 4:
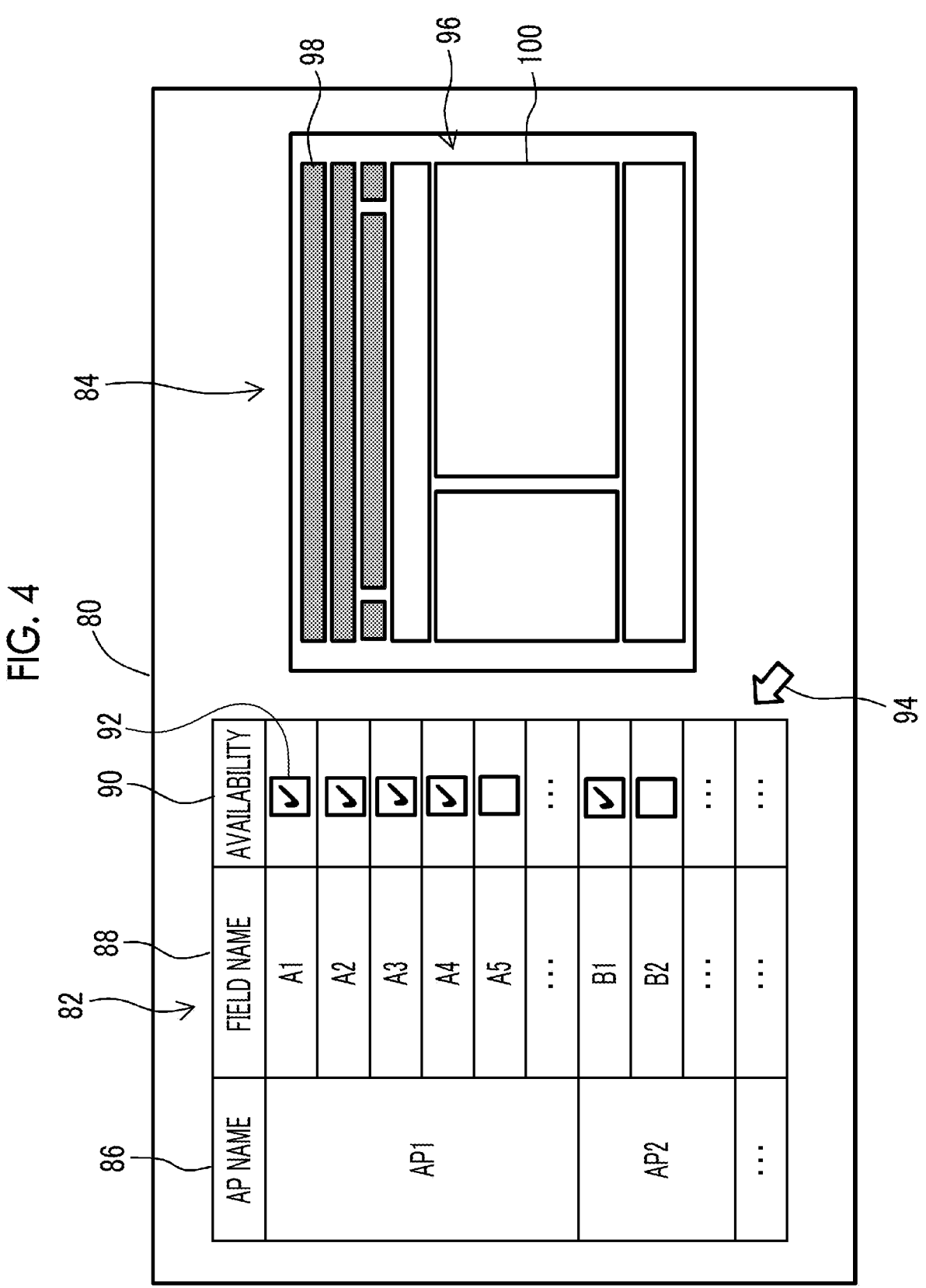
FIG. 4 is a diagram illustrating an example of a second management image.

FIG. 4 illustrates a second management image displayed on a screen 80 of a display device included in a terminal apparatus. The second management image includes an entry area 82 and a display area 84. The entry area 82 includes a column 86 having a label of an AP name, a column 88 having a label of a field name, and a column 90 having a label of availability. A plurality of AP software names are listed and displayed in the column 86. Field names for specifying a plurality of fields included in an image generated by the AP software are listed and displayed in the column 88. A plurality of check boxes 92 corresponding to a plurality of field names included in the column 88 are included in the column 90. The user clicks a check box 92 corresponding to a field of which sharing is permitted, by operating a cursor 94.

An image sample 96 generated by the currently registered AP software is schematically displayed in the display area 84. The image sample 96 includes a plurality of portions indicating the plurality of fields. For example, a portion corresponding to a field that permits sharing is represented in white (see a reference numeral 100), and a portion corresponding to a field that prohibits sharing is represented in gray (see a reference numeral 98). Accurate registration can be performed by performing a registration work while referring to the image sample 96.

FIG. 5 illustrates a third management image 104 displayed on a screen 102 of a display device included in a terminal apparatus. The third management image 104 is an image for registering availability of sharing for each element in a desktop, that is, for each content. A content name is listed and displayed in a column 106 having a label of a content in a DT. A following column 108 includes a plurality of check boxes 112 corresponding to a plurality of contents. The check box 112 corresponding to the content that is permitted to be shared is clicked by using a cursor 110.

Next, a masking method will be described with reference to FIGS. 6 to 9. It is possible to restrict transmission of an image from a terminal apparatus to an online conference server by restricting sharing. In that case, no information is provided to other participants, and it is difficult for the other participants to understand a current state. On the other hand, in a case where the image to which a mask is applied is provided, it is possible to both notify that the image is in a shared state and prevent information leakage.

Figures 6, 7:
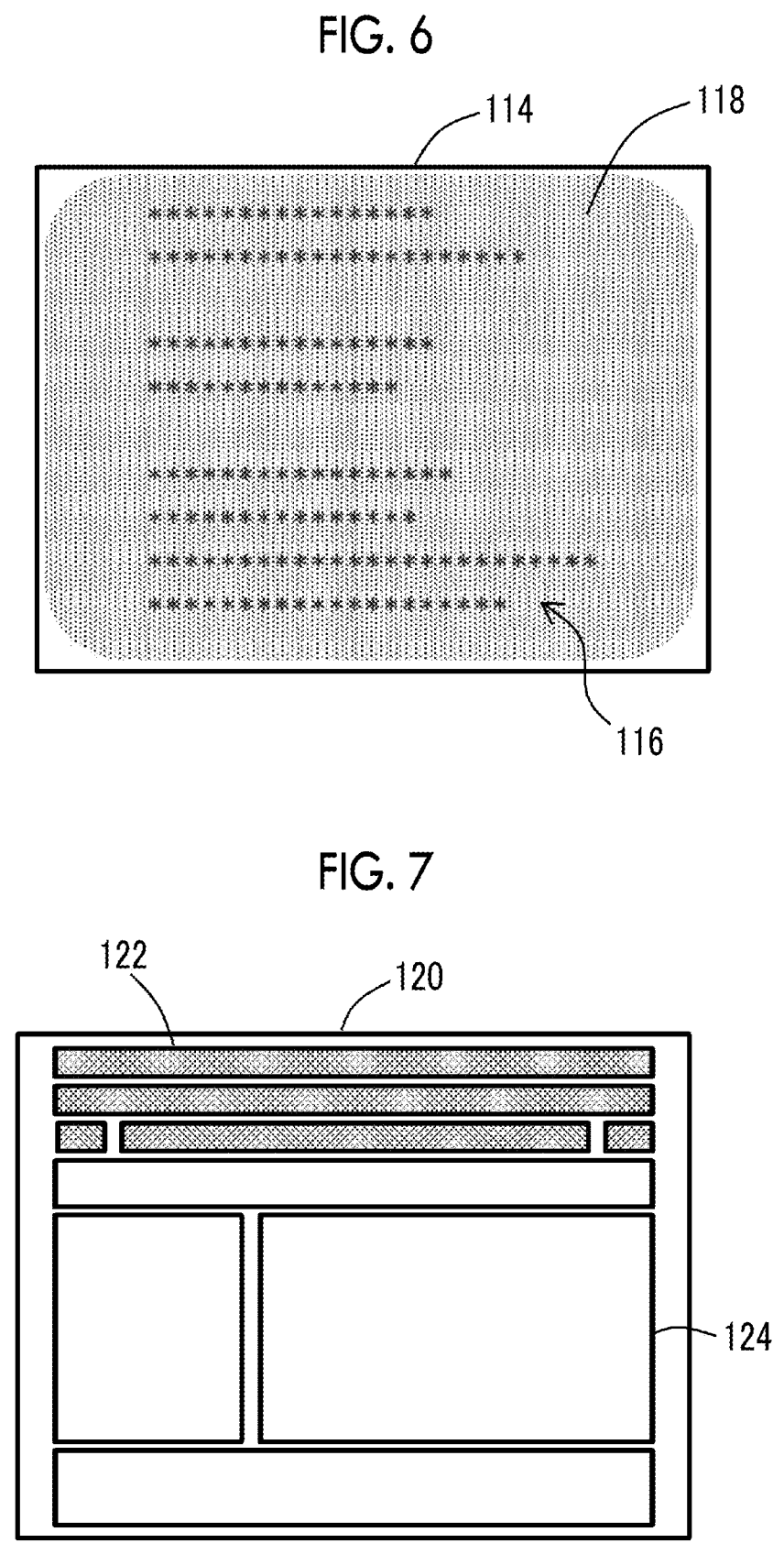

FIG. 6 illustrates a case where a mask 118 applied to an entire image 114. With the application of the mask 118, a text in the image 114 is in an unreadable state. Examples of the masking method include a paint process, a blurring process, and the like. The masking method may be selected by a user. The masking method may be designated for each AP software.

FIG. 7 illustrates an image 120 including some fields to which masks are applied. A reference numeral 124 indicates a field to which the mask is not applied, and a reference numeral 122 indicates a field to which the mask is applied. In the example illustrated in FIG. 7, sharing of the image 120 is permitted.

Figure 8:
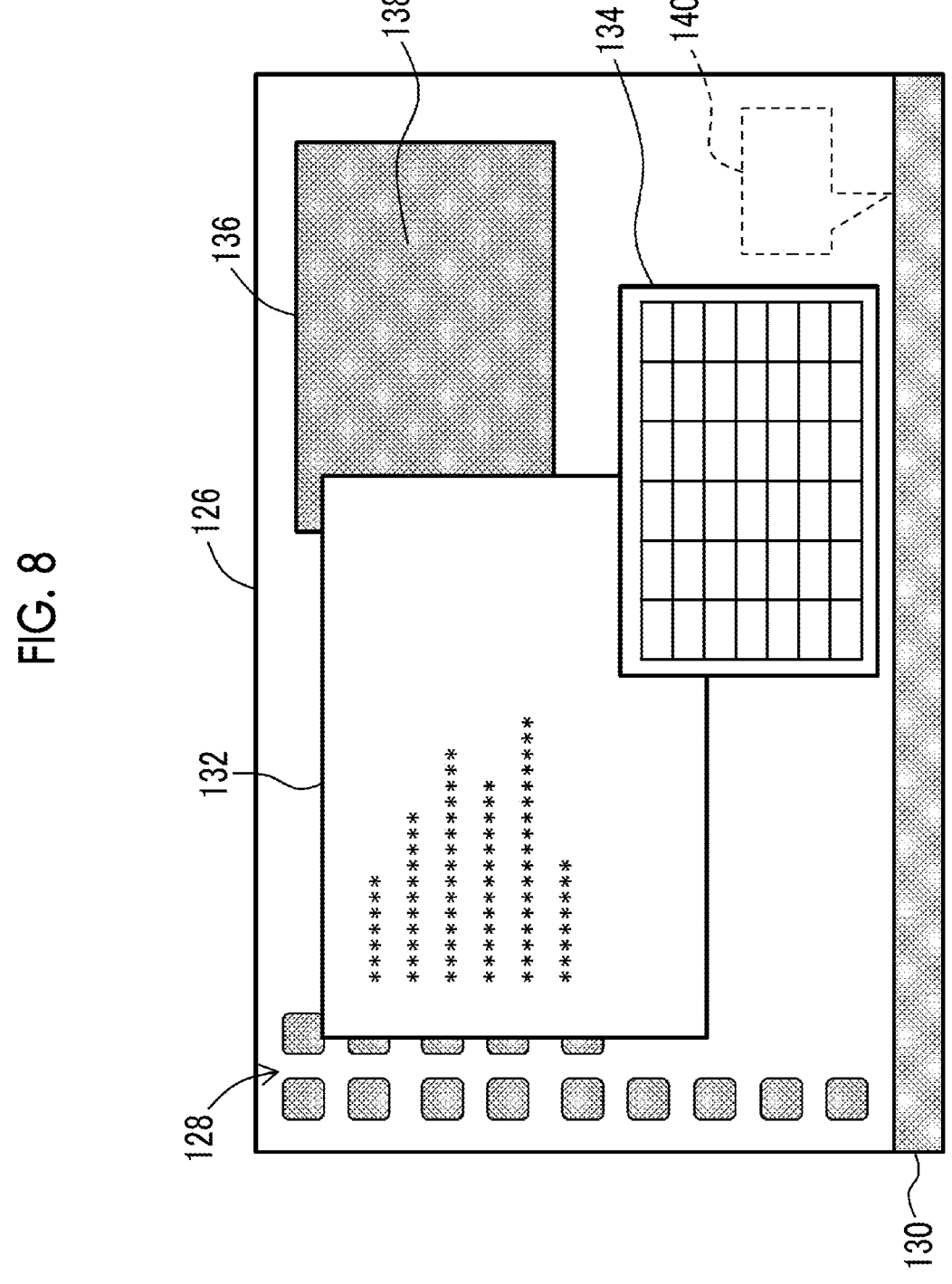
FIG. 8 is a diagram illustrating an example of a mask for a desktop image.

FIG. 8 illustrates a desktop image 126 to which masks are applied. The mask is applied to an icon group 128. The mask is also applied to a toolbar 130. The desktop image 126 includes three windows 132, 134, and 136 in an open state. The individual windows 132, 134, and 136 correspond to specific AP software, and the individual windows 132, 134, and 136 include images generated by the specific AP software.

No sharing restrictions are applied to the windows 132 and 134. On the other hand, the sharing restriction is applied to the window 136, that is, a mask 138 is applied. In this manner, even in a case where the desktop image 126 is erroneously or intentionally designated as a sharing target, it is possible to reliably prevent information that is not to be opened from being opened.

As illustrated in FIG. 8, in a case where sharing prohibition is registered for a pop-up window 140, it is possible to avoid a situation in which pop-up information is opened in any manner at a time of sharing the desktop image 126. The pop-up information is, for example, mail information, chat information, software update information, and the like. In the example illustrated in FIG. 8, the display of the pop-up window 140 is prohibited, and the pop-up window 140 may be masked instead.

The windows 132, 134, and 136 are displayed according to a file open operation of a user. Meanwhile, the pop-up window 140 is automatically displayed in a case where a certain condition is satisfied, which are different from each other.

Figure 9:
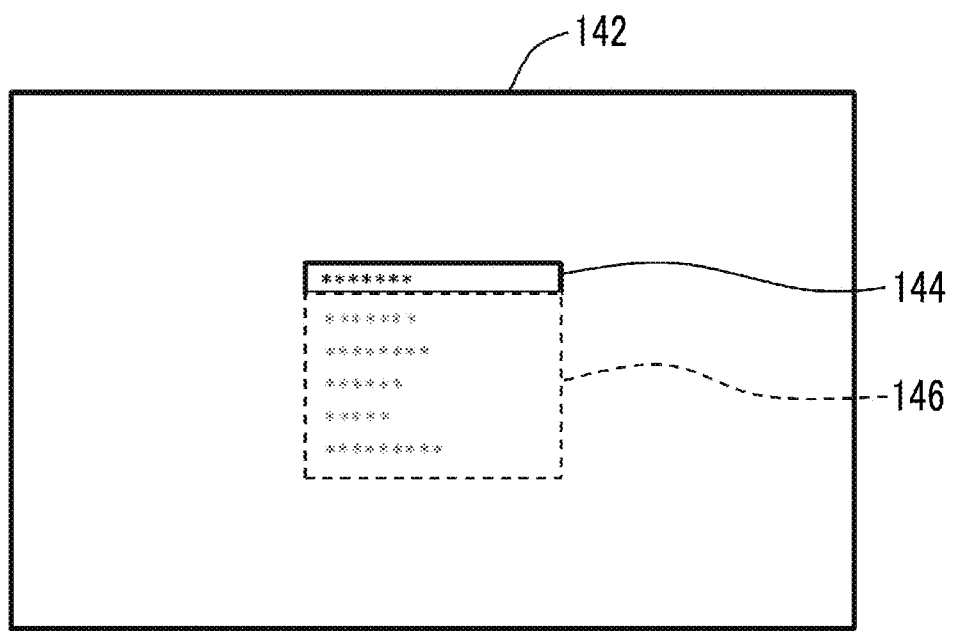
FIG. 9 is a diagram illustrating an example of a mask for a search image.

FIG. 9 illustrates a search image 142 to which a mask is applied. In a case where a text is input in an input field 144 of a keyword for search, for example, a pull-down window 146 including a plurality of keyword candidates is automatically displayed under the input field 144. The pull-down window 146 is also a kind of pop-up window in that the pull-down window 146 is automatically displayed. In the example illustrated in FIG. 9, the mask is applied to the entire pull-down window 146, and the individual keywords are in an unreadable state. Such a partial sharing restriction can prevent unnecessary information leakage or ply-based information from being opened.

Figure 10:
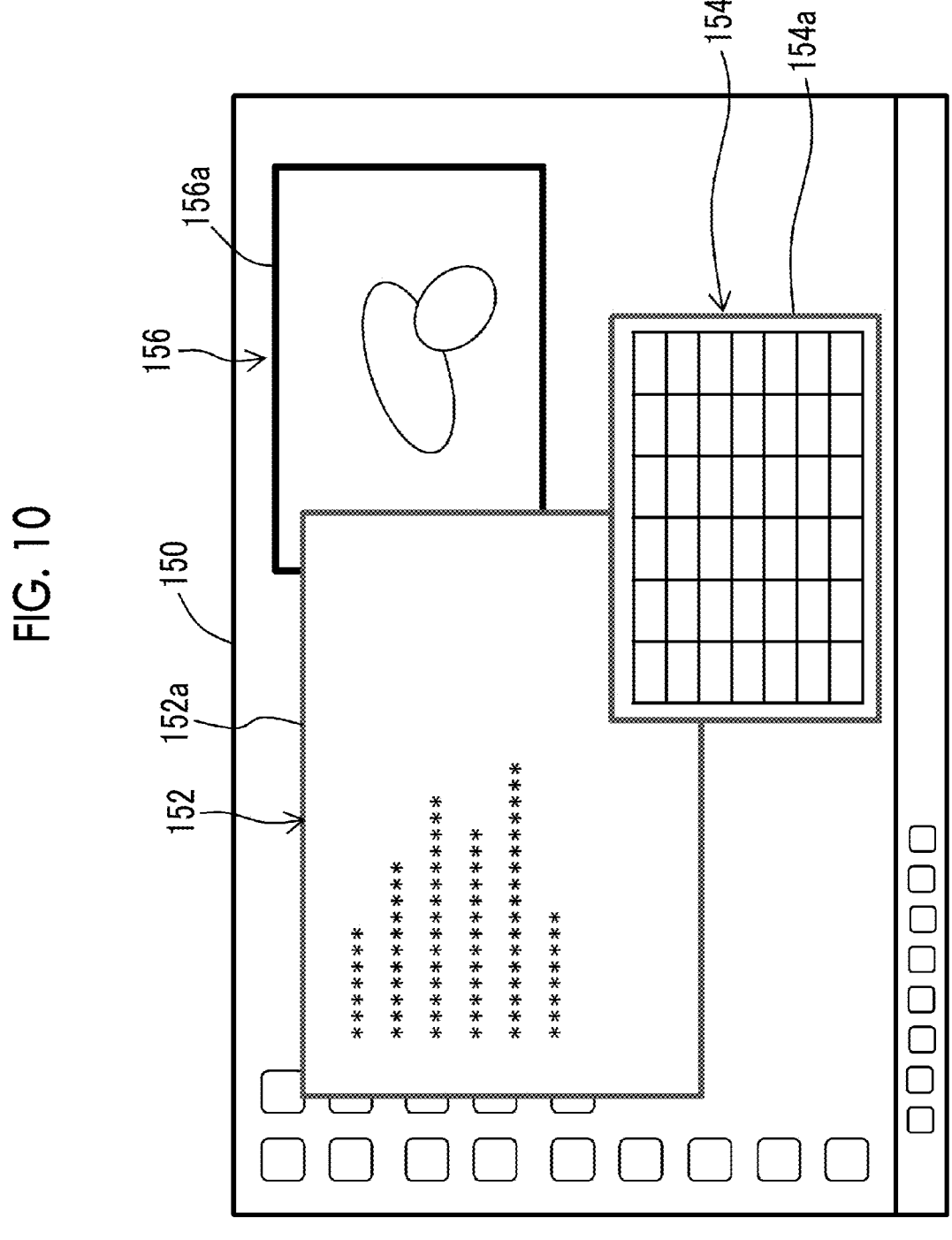
FIG. 10 is a diagram illustrating an example of a desktop image including identification information.

FIG. 10 illustrates a desktop image 150 displayed during an online conference or outside the online conference. The desktop image 150 includes three windows 152, 154, and 156. Among the windows 152, 154, and 156, the windows 152 and 154 are windows that are permitted to be shared, and the window 156 is a window that is prohibited from being shared. In the illustrated example, frames 152a and 154a of the windows 152 and 154 are displayed in a first color (for example, blue), and a frame 156a of the window 156 is displayed in a second color (for example, red). That is, it is possible to identify whether sharing is permitted or prohibited from the color of the frame for each window. Information other than the color (for example, a frame thickness) may indicate availability of sharing.

Figure 11:
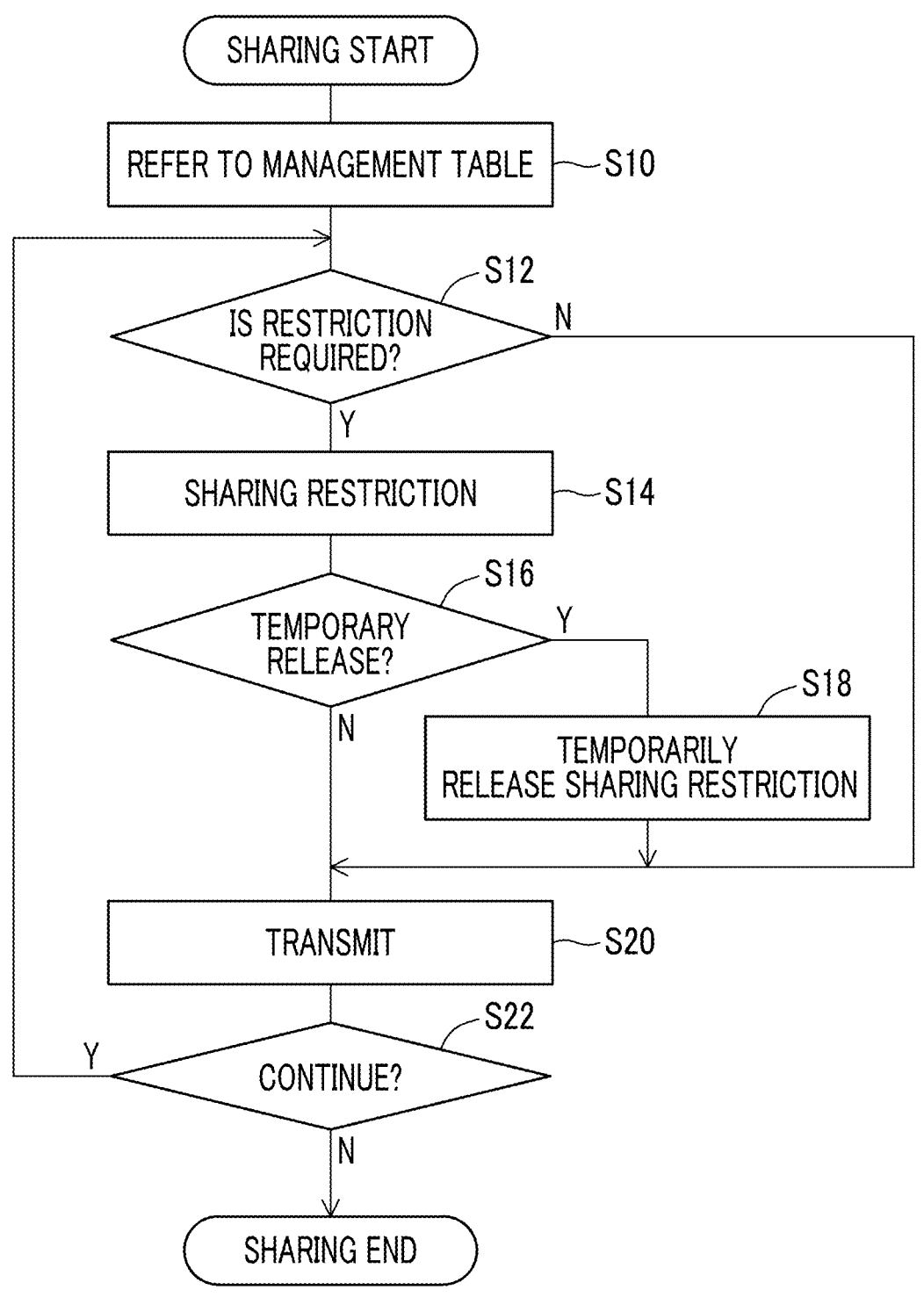
FIG. 11 is a flowchart illustrating an operation example of a terminal apparatus.

FIG. 11 illustrates an operation example of a terminal apparatus as a flowchart. In a case where a specific image (designation image) is designated for sharing, a process illustrated in FIG. 11 is executed. The process is executed by a processor in the terminal apparatus.

In S10, a management table is referenced. In S12, availability of sharing for the designation image, that is, necessity of a sharing restriction is determined. In a case where the sharing restriction is not required, the designation image is transmitted from the terminal apparatus to an online conference server, in S20. In a case where it is determined that the sharing restriction is required in S12, the sharing restriction is applied to the designation image in S14. Specifically, a mask is applied to all or a part of the designation image. All or the part of the designation image may be excluded or deleted from a sharing target.

In S16, it is determined whether or not to temporarily release the sharing restriction. In a case where a user wants the temporary release, the sharing restriction is temporarily released in S18. As a result, the designation image will be shared. In S20, the designation image to which the mask is applied or the mask is not applied is transmitted to the online conference server. In S22, it is determined whether or not to continue this process, and in a case where this process is continued, a series of steps after S12 is executed again.

Even in a case where the sharing restriction is temporarily released, the release is not reflected in the management table. The release is not carried over to the process for the next sharing target.

FIG. 12 illustrates an online conference system according to another exemplary embodiment. The online conference system is configured with an online conference server 160 connected to a network 166 and a plurality of terminal apparatuses 162 and 164. The terminal apparatuses 162 and 164 are used by participants of an online conference, and have identical configurations with each other. For example, the terminal apparatus 162 includes a main body 168, an input device 172, a display device 170, a speaker 174, a microphone 176, and the like.

The online conference server 160 includes a main body 168 and a storage unit (memory) 178. The main body 168 has a processor that executes a program. The processor functions as an image distribution unit 180. The image distribution unit 180 includes a restriction management unit 182 and a sharing restriction unit 184. A management table 186 is stored in the storage unit 178.

In FIG. 12, the restriction management unit 182 exerts the same function as the restriction management unit 36 illustrated in FIG. 1. The sharing restriction unit 184 exerts the same function as the sharing restriction unit 38 illustrated in FIG. 1. The management table 186 has the same configuration as the management table 42 illustrated in FIG. 1.

In FIG. 12, the management table 186 is generated by the restriction management unit 182. Under that premise, as illustrated in S4, an image (designation image) as a sharing target is designated by the terminal apparatus 162, and the designation image is sent to the online conference server 160. At that time, an identifier indicating the AP software that generates the designation image is also sent to the online conference server 160. In the same manner, information identifying individual image elements in the image may be sent to the online conference server 160. The online conference server 160 may recognize the AP software from an extension included in a file name of the designation image, or may identify each image portion in the image from the extension.

As illustrated in S5, the sharing restriction unit 184 determines necessity of a sharing restriction for the designation image based on the management table 186, prior to sharing the sent designation image, that is, prior to distribution to a plurality of participants. In a case where the sharing restriction is required, a mask is applied to all or a part of the designation image. As illustrated in S6, the designation image to which the sharing restriction is applied is distributed to the plurality of participants. In a case where the sharing restriction is not performed, the received designation image is distributed to the plurality of participants as it is.

In a case where the configuration illustrated in FIG. 12 is adopted, the designation images sent from the plurality of terminal apparatuses are collectively processed by the online conference server 160. For example, in a case where it is required to centrally manage sharing of information in a company, the configuration illustrated in FIG. 12 may be adopted.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An online conference apparatus comprising:
a memory that stores management information for managing availability of sharing for an image; and
a processor configured to:
in a case where a designation image comprising a plurality of fields is designated for sharing by a participant of an online conference, determine whether availability of sharing for each of the plurality of fields in the designation image is either permitted or prohibited according to the management information;
in response to the availability of sharing for a first field among the plurality of fields in the designated image being prohibited according to the management information, apply a sharing restriction to the designation image by applying the mask to the first field in the designated image; and
in response to the sharing restriction being temporarily released according to a user operation, sharing the designated image without applying the sharing restriction thereto such that no mask is applied to the designated image.

2. The online conference apparatus according to claim 1, wherein the designation image is any of an image generated by application software or a desktop image.

3. The online conference apparatus according to claim 1, wherein the sharing restriction includes a sharing restriction for an entirety of the designation image.

4. The online conference apparatus according to claim 1, wherein the management information is information in a management table in which availability of sharing is registered for each image attribute, and
the processor is configured to:
determine whether or not to apply the sharing restriction to the designation image, based on the management table.

5. The online conference apparatus according to claim 4, wherein the image attribute includes application software that generates an image, and
the processor is configured to:
determine whether or not to apply the sharing restriction to the designation image, according to the application software that generates the designation image.

6. The online conference apparatus according to claim 5, wherein in the management table, availability of sharing is registered for each image element, and
the processor is further configured to:
determine whether or not to apply the sharing restriction to each image element in the designation image.

7. The online conference apparatus according to claim 1, wherein the management information includes information for managing availability of sharing for each image element in a desktop image, and
the processor is configured to:
in a case where the designation image is a desktop image, determine whether or not to apply the sharing restriction to each image element in the desktop image.

8. The online conference apparatus according to claim 7, wherein the image element is a window, and the processor is configured to:

determine whether or not to apply the sharing restriction to each window in the desktop image.

9. The online conference apparatus according to claim 1, wherein the processor is configured to:

for each window in a desktop image, provide information indicating availability of sharing of the window.

10. The online conference apparatus according to claim 1, wherein the online conference apparatus is a terminal apparatus used by the participant.

11. The online conference apparatus according to claim 1, wherein the online conference apparatus is an online conference server connected to a terminal apparatus used by the participant.

12. The online conference apparatus according to claim 1, wherein the processor is configured to:

in response to the availability of sharing for the designated image being prohibited and the sharing restriction not being released, share the designated image in which mask is applied; and in response to the availability of sharing for the designated image being prohibited and the sharing restriction being temporarily released, share the designated image in which no mask is applied.

13. The online conference apparatus according to claim 1, wherein the management information is a management table comprising a plurality of field names respectively corresponding to the plurality of fields in the designated image and a plurality of labels indicating availability for sharing respectively corresponding to the plurality of field names, wherein the plurality of field names comprise a first field name corresponding to the first field, wherein the processor determines that the first field in the designated image is prohibited according to a label, among the plurality of labels, corresponding to the first field name in the management table.

14. A non-transitory computer readable medium storing a program that is executed in an information processing apparatus, and causes the information processing apparatus to operate as an online conference apparatus, the program comprising:

a function of storing management information for managing availability of sharing for an image;

a function of, in a case where a designation image comprising a plurality of fields is designated for sharing by a participant of an online conference, determining whether availability of sharing for each of the plurality of fields in the designation image is either permitted or prohibited according to the management information;

a function of, in response to the availability of sharing for a first field among the plurality of fields in the designated image being prohibited according to the management information, applying a sharing restriction to the designation image by applying the mask to the first field in the designated image; and a function of, in response to the sharing restriction being temporarily released according to a user operation, sharing the designated image without applying the sharing restriction thereto such that no mask is applied to the designated image.

15. An online conference method comprising:

storing management information for managing availability of sharing for an image;

in a case where a designation image comprising a plurality of fields is designated for sharing by a participant of an online conference, determining whether availability of sharing for each of the plurality of fields in the designation image is either permitted or prohibited according to the management information;

in response to the availability of sharing for a first field among the plurality of fields in the designated image being prohibited according to the management information, applying a sharing restriction to the designation image by applying the mask to the first field in the designated image; and in response to the sharing restriction being temporarily released according to a user operation, sharing the designated image without applying the sharing restriction thereto such that no mask is applied to the designated image.

\* \* \* \* \*